No. 720,272. PATENTED FEB. 10, 1903.
L. D. MOORE.
COMBINED COTTON SCRAPER, CHOPPER, AND CULTIVATOR.
APPLICATION FILED JULY 15, 1902.
NO MODEL. 2 SHEETS—SHEET 2.
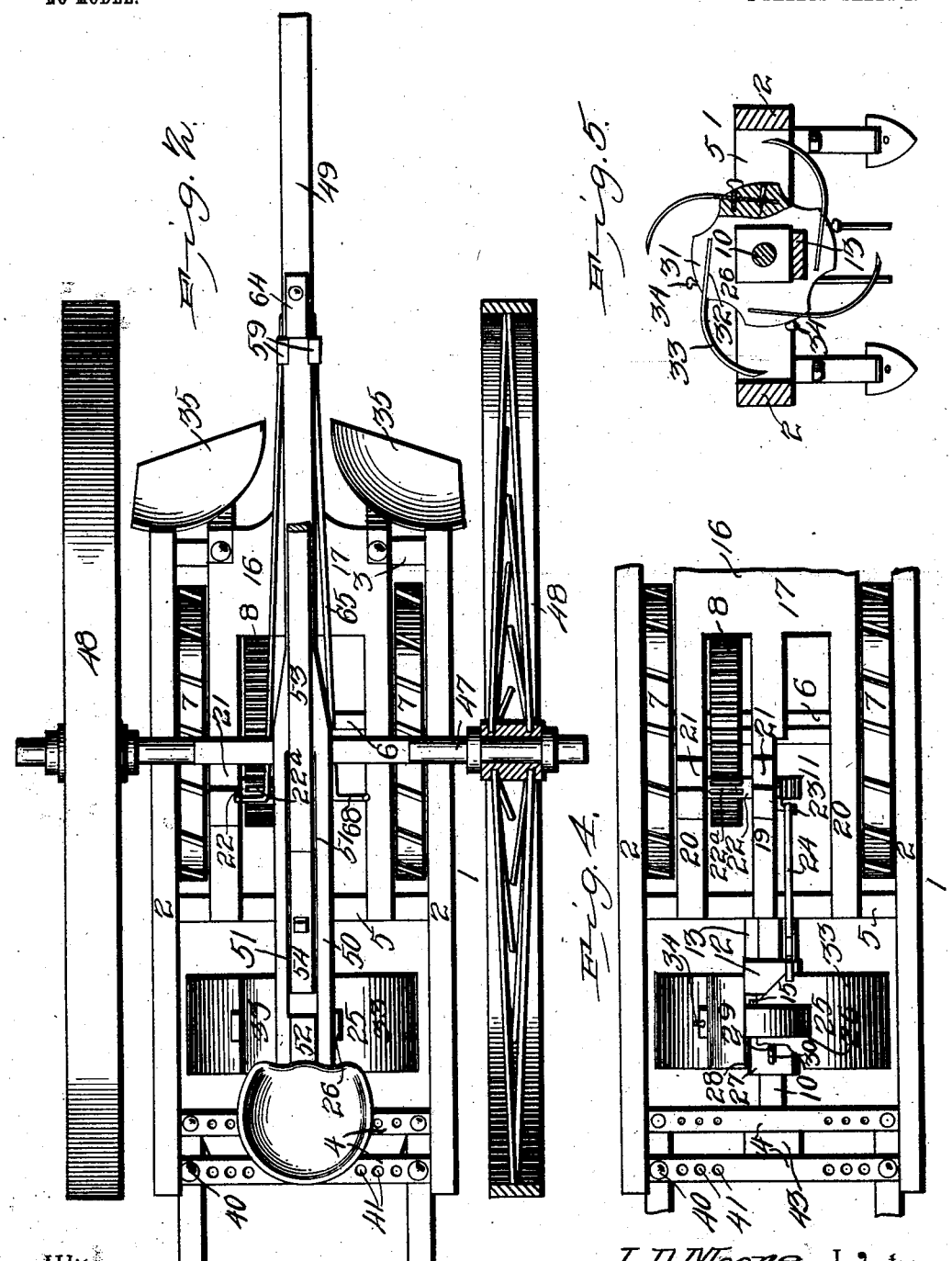
Witnesses L. D. Moore, Inventor.

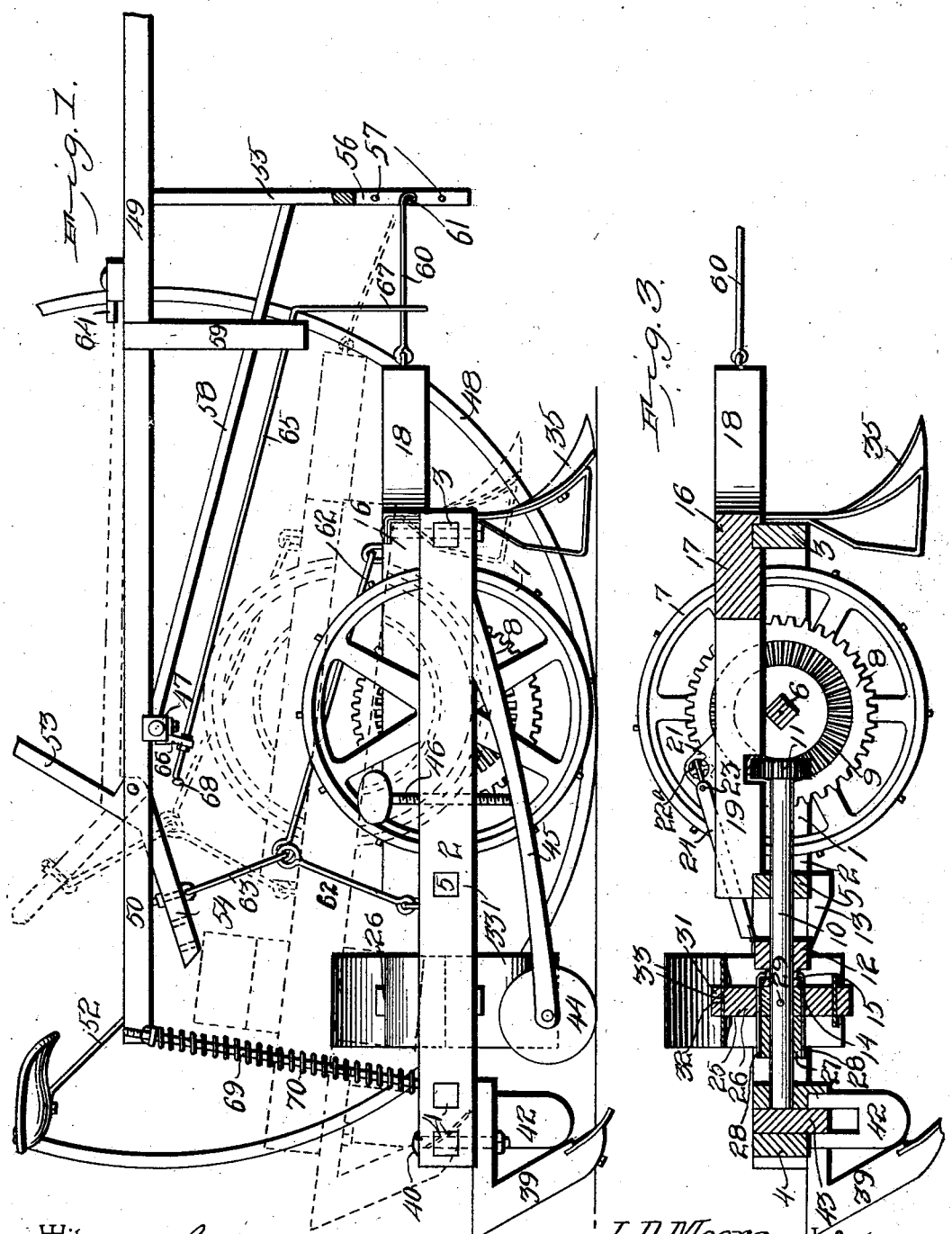

United States Patent Office.

LILBURN DONNY MOORE, OF COLT, ARKANSAS.

COMBINED COTTON SCRAPER, CHOPPER, AND CULTIVATOR.

SPECIFICATION forming part of Letters Patent No. 720,272, dated February 10, 1903.

Application filed July 15, 1902. Serial No. 115,687. (No model.)

*To all whom it may concern:*

Be it known that I, LILBURN DONNY MOORE, a citizen of the United States, residing at Colt, in the county of St. Francis and State of Arkansas, have invented a new and useful Combined Cotton Scraper, Chopper, and Cultivator, of which the following is a specification.

My invention is an improved combined cotton scraper, chopper, and cultivator adapted for use in connection with a sulky-frame on which the driver rides.

My invention consists in the peculiar construction and combination of devices hereinafter fully set forth and claimed.

In the accompanying drawings, Figure 1 is a side elevation of a combined cotton scraper, chopper, and cultivator embodying my improvements, showing the same in connection with a sulky, to which it is attached and by which it is adapted to be drawn, the near wheel of the sulky being removed and a part only of the other wheel being shown in outline. Fig. 2 is a top plan view of the same. Fig. 3 is a vertical longitudinal sectional view of my improved combined cotton scraper, chopper, and cultivator, the same being shown detached from the sulky. Fig. 4 is a partial top plan view of the same. Fig. 5 is a vertical transverse sectional view of the same, taken on a plane near the revoluble chopping element, the latter being also shown partly in section.

In the embodiment of my invention I provide a frame 1, which is here shown as comprising a pair of longitudinally-disposed parallel side bars 2, a cross-bar 3, which connects them together at their front ends, a pair of parallel cross-bars 4, which connect them together at their rear ends, and an intermediate cross-bar 5. A transversely-disposed shaft 6 has its bearings in the side bars 2. The said shaft is disposed near the front end of the frame 1 and is provided near its ends with a pair of supporting and traction wheels 7, which are disposed just within the side bars 2. On the said shaft is a master-wheel 8, which is provided with peripheral spurs and is provided on its inner side with crown-spurs 9. A longitudinally-disposed shaft 10 is journaled in bearings in the intermediate cross-bar 5 and at the rear end of the frame.

The said shaft is disposed midway between the side bars 2 and is provided at its front end with a pinion 11, which is fast thereon and engages crown-gear 9 of the master-wheel, so that the shaft 10 is caused to rotate when the machine is moved forwardly, as will be understood. A cross-head 12 is disposed on the shaft 10, the latter being revoluble in the cross-head and the cross-head being longitudinally movable on the said shaft. The cross-head is secured against rotation and is guided on a bracket way or arm 13, which is here shown as attached to the cross-bar 5 and projecting rearwardly therefrom under the said shaft, with its upper surface engaging the lower side of the cross-head. The cross-head is provided with a rearwardly-extending tubular spindle 14, which has at its front end an annular flange 15.

At the front and on the upper side of frame 1 a frame 16 is here shown, which has at its front end a transverse portion 17, from the front and rear sides of which extend a tongue 18 and a longitudinal bar 19. At the opposite side of the transverse portion 17 are rearwardly-extending bars 20, which are parallel with the bar 19. The transverse portion 17 of the frame 16 is secured on the front cross-bar 3 of the frame 1, and the rear ends of the bars 19 20 are secured on the cross-bar 5. On one of the bars 20 and on the bar 19 are bearings 21, in which is journaled a shaft 22. The said shaft has a spur-pinion 22ª, that engages the spurred periphery of the master-wheel 8, and at the inner end of the said shaft is a crank 23, the wrist of which is connected to the cross-head 12 by a pitman 24. It will be understood from the foregoing that when the machine is in motion the cross-head is caused to reciprocate longitudinally on the shaft 10.

On the shaft 10 is a revoluble chopper 25, which is adapted to revolve with the said shaft and to reciprocate longitudinally thereon. Any suitable connection may within the scope of my invention be made between the chopper and the shaft 10, so that the former will be caused to revolve with and permitted to reciprocate longitudinally on the latter. In the embodiment of my invention here shown the hub portion 26 of the revoluble chopper has a central sleeve 27, which forms its bearing, the shaft 10 extending through the bore of the said sleeve, and the latter is connected by a pair of straps 28 to the flanged sleeve of the cross-head 12. Thereby a swiveled connection is effected between the revoluble chopper and the cross-head, so that the former will be caused to reciprocate with the latter. The cross-pin 29 projects from opposite sides of the shaft 10 and operates in longitudinal slots 30, with which the sleeve of the chopper is provided. This construction admits of the reciprocating motion of the chopper on the shaft, while causing the chopper to rotate with the shaft, as will be understood. The hub portion of the chopper is provided with radial projections 31, which, in effect, form arms, and each of which has a tangential opening 32, that extends to one side thereof. The chopping-hoes 33 are preferably of the form shown in Fig. 5 of the drawings and have their inner portions inserted and adjustable in the openings 32, so that the radius of the revoluble chopper may be increased or diminished, as may be desired. Within the scope of my invention any suitable means may be employed to secure the chopping-hoes when adjusted, set-screws 34 being herein shown for this purpose.

At the front end of the frame 1 are secured a pair of scrapers 35, which are spaced apart a sufficient distance to enable them to operate on opposite sides of a row of cotton-plants. The revoluble chopper is so disposed as to operate directly over the row of plants. At the rear end of the frame 1 are a pair of cultivator attachments 39, the beams of which are secured to the under sides of the cross-bars 4 by bolts 40. The cross-bars 4 have a plurality of adjusting-openings 41 for the reception of the bolts 40, by which construction the cultivator attachments are adjustably secured to the frame 1 and may be set at any distance apart, so that the soil will be stirred by them as close to or as far from the rows of plants as may be desirable. A pair of fenders 42 depend from and are attached to a block 43, which is secured centrally between the cross-bars 4. The said fenders are disposed a suitable distance apart and abreast of each other, so that they pass on opposite sides of the row of plants, and the fenders are slightly in advance of the shovels or tongues of the cultivator attachments, and hence serve to prevent the plants from being covered or injured by the earth or stones upturned by the cultivator attachments.

A pair of supporting wheels or rollers 44 have their bearings at the rear ends of spring-arms 45. The said spring-arms lie under the side bars 2 of the frame 1 and have their front ends attached to the said side bars, and the rollers 44 are disposed near the rear end of the said frame 1, so that the rear portion of the latter is supported by the said rollers or wheels 44, as will be understood. Adjusting-screws 46 operate in threaded openings in the side bars 2 and bear on the spring-arms 45, whereby the rear ends of the latter, and hence the wheels or rollers 44, are adjustable vertically. This enables the depth at which the cultivating attachments operate in the soil to be regulated and predetermined, as will be understood.

It will be understood that when the machine is drawn along parallel with and astride of a row of plants the scrapers and cultivator attachments will operate to scrape the earth from opposite sides of the ridge and to stir the soil adjacent thereto and that the revoluble chopping element will chop out the superfluous plants, leaving the "stands" at suitable regular distances apart. Owing to the fact that the revoluble chopper reciprocates longitudinally its strokes are delivered squarely at right angles to the row and not obliquely thereto, as would otherwise be the case. In practice the gears will be so proportioned that the effect of each rear stroke of the revoluble chopper will be to counteract the forward motion of the machine, so that the revoluble chopper will be stationary with relation to that portion of the row on which it is delivering its stroke. Hence, as before stated, the strokes of the revoluble chopper, owing to its reciprocating motion, are squarely at right angles to the row and not obliquely with relation thereto.

I will now describe a sulky on which the driver may ride and which is adapted to be used in connection with my combined cotton scraper, chopper, and cultivator to draw the same and enable the same to be raised and lowered.

A transversely-disposed axle 47 has spindles at its ends, on which are the supporting-wheels 48, that are a suitable distance apart to be disposed on opposite sides of the combined cotton scraper, chopper, and cultivator and are of such diameter as to maintain the axle at a suitable distance above the same. A tongue or draft-pole 49 is secured to the axle 47 and has an arm 50, which projects rearwardly from the said axle and is here shown as provided with a vertical longitudinal slot 51. The seat-supporting bar 52 is secured to the rear end of the arm 50, and to the latter is fulcrumed a hand-lever 53, which has an arm 54 disposed at an appropriate angle thereto, which arm operates in the slot 51. A draft-hanger 55 depends from the tongue or pole 49 at a suitable distance in advance of the axle 47 and has its lower end slotted or bifurcated, as at 56, and provided with a plurality of adjusting-openings 57. A brace-bar 58 connects the lower portion of the draft-hanger to the draft pole or tongue, as shown in Fig. 1, and a pair of hangers 59 depend from opposite sides of the pole or tongue 49, are disposed astride of the brace-bar, and their lower ends extend below the latter.

The tongue 18 of the combined cotton scraper, chopper, and cultivator is connected by a draft-link 60 to a pin 61, which is adjustable vertically in the hanger 55 by means of the openings 57. Links 62 are connected to diverging points on the cultivator, chopper, and scraper frame and are connected to a link 63, which is attached to the arm 54 of lever 53. It will be understood that by operating the hand-lever 53 the combined scraper, chopper, and cultivator may be raised and lowered. The said lever may be locked in position to support the scraper, chopper, and cultivator when raised by means of a keeper 64 on the tongue 49, with which keeper the said lever may be engaged and disengaged at will. To enable the combined scraper, chopper, and cultivator to be guided to conform to deviations in the rows of plants, I provide a pair of rock-shafts 65, which have their bearings in the hangers 59 and in brackets 66, which are secured to the axle 47. Said rock-shafts have depending arms 67 at their front ends, which are adapted to bear against opposite sides of the draft-link 60, and at the rear ends of the said rock-shafts are outwardly and oppositely extended foot levers or arms 68. The driver by appropriately pressing on said lever 58 with his feet may guide the combined scraper, chopper, and cultivator to keep the same parallel with the row, as will be understood. In order to steady the combined scraper, chopper, and cultivator, I connect the same at points near its rear corners to the rear portion of the arm 50 by rods or other suitable connections 69, on which are coiled extensile springs 70. These springs while permitting of the vertical movement of the frame of the combined scraper, chopper, and cultivator exert constant downward pressure thereon and greatly facilitate the operation thereof.

Having thus described my invention, I claim—

1. In a cotton-chopper, the combination of a longitudinal shaft, means to rotate the same, a chopping element revoluble with and movable longitudially on said shaft, and means to impart reciprocatory motion to the chopping element while the same is revolving, substantially as described.

2. In a cotton-chopper, the combination of a chopping element, a support therefor, means to revolve said chopping element and means to impart longitudinal reciprocatory motion thereto while the same is revolving, substantially as described.

3. In a cotton-chopper, the combination of a frame having longitudinal and transverse bearings, an axle-shaft in the transverse bearings and having supporting traction-wheels, a shaft in the longitudinal bearings, gears connecting said shafts, a revoluble chopper connected to the longitudinal shaft for rotation therewith and for longitudinal movement thereon, and means to impart reciprocating motion to the chopper, the said means being geared to the axle-shaft, substantially as described.

4. In a cotton-chopper, the combination of a frame having longitudinal and transverse bearings, an axle-shaft in the transverse bearings and having supporting traction-wheels, a shaft in the longitudinal bearings, a chopper on said shaft adapted to rotate therewith and to move longitudinally thereon, a master-wheel on the axle-shaft, a pinion on the longitudinal shaft engaging said master-wheel, whereby the longitudinal shaft and chopper are rotated, a crank-shaft geared to the master-wheel, bearings for said crank-shaft, and a pitman connecting said crank-shaft to the revoluble chopper, whereby the latter is reciprocated while being revolved, substantially as described.

5. In a cotton-chopper, the combination of a longitudinally-disposed shaft, means to rotate the same, a chopper rotated by said shaft and longitudinally movable thereon, a cross-head mounted on said shaft for reciprocating motion a connection between the cross-head and the revoluble chopper and means to reciprocate the cross-head and thereby reciprocate the chopper while the latter is being revolved, substantially as described.

6. In a cotton-chopper, the combination of a frame, having longitudinal and transverse bearings, an axle-shaft in the transverse bearings and having supporting traction-wheels, a shaft in the longitudinal bearings, a chopper adapted to revolve and mounted on said shaft for rotation therewith and longitudinally movable thereon, a master-wheel on the axle-shaft, a pinion on the longitudinal shaft engaging said master-wheel, whereby the longitudinal shaft and chopper are rotated, a cross-head mounted on the longitudinal shaft for reciprocatory motion, loose thereon and connected to the chopper, a crank-shaft, geared to the master-wheel, bearings for said crank-shaft and a pitman connecting the latter to the cross-head, whereby the chopper is reciprocated while being revolved, substantially as described.

7. A cotton-chopper comprising a frame, supporting-wheels for the front end thereof, a revoluble chopper disposed near the rear end of the frame, means to rotate the chopper, cultivators at the rear end of the frame, spring-arms attached to the latter and extending rearwardly, supporting-wheels or rollers for the rear end of the frame carried by said spring-arms, and set-screws mounted in the side beams of the frame and bearing against said spring-arms to limit the vertical movement of the latter, substantially as described.

8. A cotton-chopper comprising a frame, supporting-wheels for the front end thereof, a revoluble chopper disposed near the rear end of the frame, means to rotate the chopper, cultivators at the rear end of the frame, spring-arms attached to the latter, supporting-wheels for the rear end of the frame carried by said spring-arms, and vertically-adjustable means for limiting the movement of said spring-arms.

In testimony that I claim the foregoing as my own I have hereto affixed my signature in the presence of two witnesses.

LILBURN DONNY MOORE.

Witnesses:
M. DAVIDSON,
J. A. GATTEN.